United States Patent [19]
Inoue

[11] 4,372,576
[45] Feb. 8, 1983

[54] HOLLOW STABILIZER FOR VEHICLE

[75] Inventor: Kanji Inoue, Yokohama, Japan

[73] Assignee: NHK Spring Co., Ltd., Yokohama, Japan

[21] Appl. No.: 212,500

[22] Filed: Dec. 3, 1980

[30] Foreign Application Priority Data

Dec. 22, 1979 [JP] Japan .............. 54-167282

[51] Int. Cl.³ .................................. B60G 19/00
[52] U.S. Cl. .......................... 280/689; 267/57; 280/721
[58] Field of Search .......... 280/689, 721; 267/57, 267/154

[56] References Cited
U.S. PATENT DOCUMENTS

| 1,823,158 | 9/1931 | Mogford et al. | 301/124 R |
| 4,138,141 | 2/1979 | Andersen | 280/689 |
| 4,231,555 | 11/1980 | Saito | 267/154 |

FOREIGN PATENT DOCUMENTS

| 631146 | 6/1936 | Fed. Rep. of Germany . |
| 868537 | 2/1953 | Fed. Rep. of Germany . |
| 919615 | 3/1947 | France . |

Primary Examiner—Joseph F. Peters, Jr.
Assistant Examiner—John A. Carroll
Attorney, Agent, or Firm—Frishauf, Holtz, Goodman and Woodward

[57] ABSTRACT

A hollow stabilizer embodying the invention is made of a curved welded metal pipe. The seam of the welded pipe takes a specific position which is determined by the ratio of the layer thickness of the pipe to the outer diameter thereof and by the ratio of the radius of curvature of the curved section thereof to the outer diameter thereof. In case both ratios are relatively large, the seam is so positioned that it extends along a curve having as small or large a curvature as possible and that an angle of about 30° at most is defined by a line passing the axis of the pipe and the center of curvature thereof and a line passing the axis and the seam of the pipe. In case both ratios are relatively small, the seam is so positioned that it extends along a curve having as small a curvature as possible and that an angle of 45° at most is defined by said lines.

5 Claims, 10 Drawing Figures

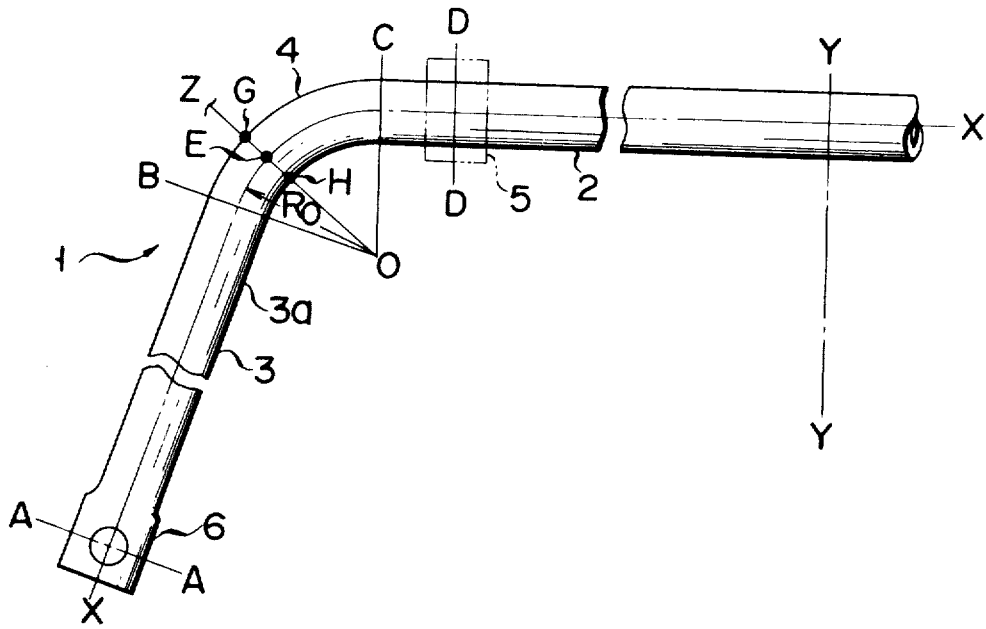

HOLLOW STABILIZER FOR VEHICLE

BACKGROUND OF THE INVENTION

This invention relates to a hollow stabilizer for a vehicle, and more particularly to a stabilizer made of one metal pipe and having a torsion section to be coupled to a chassis, a pair of arm sections to be coupled to a wheel suspension and a pair of curved sections each connecting the torsion section and the corresponding arm section.

There is tendency that stabilizers for vehicles are made of a pipe in order to reduce their weight. They are usually made of a seamless pipe, not a welded pipe such as an electric-welded pipe. A seamless pipe is strong against fatigue and provides a reliable stabilizer. But it is expensive. By contrast, a welded pipe is inexpensive. But its seam fatigues more quickly than the other portion, particularly when the pipe is repeatedly subjected to a large stress. This is why a welded pipe is not usually used to form a stabilizer for a vehicle despite its low cost.

It is an object of this invention to provide a hollow stabilizer for a vehicle, which is made of a welded pipe and which is as strong against fatigue and as reliable as a stabilizer made of a seamless pipe.

SUMMARY OF THE INVENTION

In order to accomplish the above-mentioned object, the invention uses a welded pipe and the seam or bead of the pipe takes a specific position which is determined by the ratio of the radius of curvature of the curved sections to the outer diameter thereof (hereinafter called "curvature ratio") and by the ratio of the wall thickness of the pipe to the outer diameter thereof (hereinafter called "thickness ratio"). In one preferred embodiment of the invention, in case both the thickness ratio and the curvature ratio are relatively large, the seam is so positioned that it extends along a curve having as small or large a curvature as possible and that an angle of about 30° or less is defined by a line passing the axis of either curved section and the center of curvature thereof and a line passing the axis of either curved section and the seam. On the other hand, in case both the thickness ratio and the curvature ratio are relatively small, the seam is so positioned that it extends along a curve having as small a curvature as possible and that an angle of about 45° or less is defined by a line passing the axis of either curved section and the center of curvature thereof and a line passing the axis of either curved section and the seam.

BRIEF DESCRIPTION OF THE DRAWINGS

FIG. 1 shows the left half of a hollow stabilizer embodying this invention;

FIGS. 2(a), 2(b) and 2(c) respectively illustrate how the bending stress, torsional stress and principal stress are distributed in the axial direction of the stabilizer of FIG. 1;

FIG. 3 is a cross sectional view of the stabilizer shown in FIG. 1, taken along line O-Z in FIG. 1;

FIGS. 4(a), 4(b) and 4(c) respectively illustrate how the bending stress, torsional stress and principal stress are distributed in the circumferential direction of the stabilizer shown in FIG. 3;

FIG. 5 is a graph showing the fatigue strength of a stabilizer which is made of a seamless pipe in comparison with that of a stabilizer which is made of a welded pipe; and FIG. 6 illustrates how the principal stress is distributed in the circumferential direction of the stabilizer shown in FIG. 3 in case both the thickness ratio and the curvature ratio of the stabilizer are varied.

DETAILED DESCRIPTION

An embodiment of this invention will now be described with reference to the accompanying drawings. As shown in FIG. 1, a hollow stabilizer 1 according to the invention is made of a welded metal pipe and consists of a torsion section 2, a pair of arm sections 3 (only one being shown) and a pair of curved sections 4 (only one being shown) connecting the torsion section 2 to the arm sections 3. To use the stabilizer 1, the torsion section 2 is coupled to, for example, an automobile chassis (not shown) by means of a connecting member 5 and the free end portions 6 or connecting portions 6 of the arm sections 3 are coupled to a wheel suspension (not shown).

In FIG. 1, a curve X-X is the axis of the stabilizer 1, a line Y-Y is the center line of the automobile chassis, and O denotes the center of curvature of the curved section 4. A line A-A intersects with the axis X-X to define the center of the connecting portion 6. A line O-B denotes the interface between the arm section 3 and the curved section 4, and a line O-C the interface between the torsion section 2 and the curved section 4. A line D-D intersects with the axis X-X to define the center of the connecting member 5.

When the stabilizer of the above-mentioned structure is exerted with load, a bending stress $\sigma_B$ and a torsional stress $\sigma_T$ are distributed along the axis X-X as illustrated in FIG. 2(a) and 2(b), respectively. Thus, a principal stress $\sigma_O$ composed of bending stress $\sigma_B$ and torsional stress $\sigma_T$ is distributed along the axis X-X as illustrated in FIG. 2(c). The maximum principal stress is exerted on that portion of the curved section 4 which lies in plane O-Z which in turn lies somewhere between the interfaces O-B and O-C.

In plane O-Z, bending stress $\sigma_B$ is distributed in the circumferential direction of the stabilizer as shown in FIG. 4(a), and torsional stress $\sigma_T$ is distributed in the circumferential direction of the stabilizer as shown in FIG. 4(b). Principal stress $\sigma$ is therefore expressed as:

$$\sigma = \sigma_B/2 \pm (\sigma_B^2/4 + \sigma_T^2)^{\frac{1}{2}}.$$

$\sigma_B/2 + (\sigma_B^2/4 + \sigma_T^2)^{\frac{1}{2}}$ denotes the principal stress applied on that portion of the stabilizer 1 which is expanded, and $\sigma_B/2 - (\sigma_B^2/4 + \sigma_T^2)^{\frac{1}{2}}$ denotes the principal stress applied on that portion of the stabilizer 1 which is compressed. Hence, principal stress $\sigma$ is distributed in the circumferential direction of the stabilizer 1 as illustrated in FIG. 4(c). In FIG. 4(a) and FIG. 4(c), E and F designate the points where the maximum principal stresses are applied to those portions of the curved section 4 which lie in the plane O-Z (FIG. 1), and G and H the points where the maximum principal stresses are exerted on those portions of the curved section 4 which lie in the O-Z plane. The points E and F are located on curves the curvature of which is equal to that $(1/R_0)$ of the axis X-X, i.e. the inverse number of the radius $R_0$ of the curved axis X-X. The point G is on a curve the curvature of which is the smallest $(1/R_2)$, and the point H on a curve the curvature of which is the largest $(1/R_1)$. Both theoretically and experimentally it has been ascertained that principal stress is distributed in the circumferential direction of the stabilizer 1 as illustrated in FIG. 4. The stabilizer embodying this invention was put to a fatigue test. The result of the test proved that those portions of the stabilizer which correspond to points E and F fatigued most and that the stabilizer was eventually broken at those portions.

That is, a great principal stress exerts on the curved section 4. And in the plane O-Z the maximum stress exerts on points E and F which lie respectively on two curves the curvature of which is equal to that of the curved axis X-X. From this fact it is well supposed that in any other plane perpendicular to the axis X-X of the curved section 4 maximum principal stress is applied on the points lying on two curves the curvature of which is nearly equal to that of the axis X-X. In other words, minimum principal stress is applied on those portions of the curved section 4 which lie on the curves of the largest curvature and the smallest curvature.

This invention is based on the above-mentioned facts. It consists in positioning a welded pipe in such a manner that its seam 3a which fatigues more than any other portion extends along a curve of substantially the largest or smallest curvature of all the curves that define the curved section of the pipe. In the embodiment of FIG. 1 the seam 3a extends along a curve of the largest curvature. This measure taken, the welded pipe can provide a hollow stabilizer which is as strong against fatigue as a hollow stabilizer made of a seamless pipe.

FIG. 5 shows the relation between the repetition number N of load tests and the maximum principal stress $\sigma$, the former plotted on the horizontal axis and the latter plotted on the vertical axis. A solid line M represents the fatigue characteristic of a hollow stabilizer made of a manganese steel (JIS SMn443) seamless pipe having a wall thickness of 2.3 mm and an outer diameter of 17.3 mm. Marks "o" denote the fatigue characteristic of a hollow stabilizer made of a manganese steel (JIS SMn443) welded pipe of the same dimensions which has its seam positioned along a curve on which point G lies and which has the smallest curvature. Marks "Δ" denote the fatigue characteristic of a hollow stabilizer made of a manganese steel (JIS SMn443) welded pipe of the same dimensions which has its seam positioned along a curve on which point E lies and which has the same curvature as that of the axis X-X of the curved section. As FIG. 5 clearly shows, the stabilizer with its seam positioned on a curve on which point G lies is substantially as strong against fatigue as the stabilizer made of a seamless pipe of the same material and the same size. By contrast, the stabilizer with its seam positioned on a curve on which point E lies turns out to be far less strong against fatigue that the stabilizer made of a seamless pipe of the same material and the seam size.

In the plane O-Z, principal stress is distributed in a different manner in the circumferential direction of the stabilizer 1 according to the thickness ratio $m(=t_0/d)$, where $t_0$ is the wall thickness of the stabilizer 1 and d is the outer diameter thereof or the curvature ratio $c(=R_0/d)$ of the curved section 4. As shown in FIG. 6, the smaller the ratios m and c are, the closer is that portion of the section 4 to point H, which is exerted with the maximum principal stress. This will be evident when curves $\sigma_1$ to $\sigma_4$ shown in FIG. 6 are compared.

A number of hollow stabilizers were made of seamless pipes having an outer diameter d of 24 mm, a layer thickness $t_0$ of 2 mm and, thus, a thickness ratio m of 0.083. The stabilizers are put to repeated fatigue tests. Upon the tests it was found that the maximum principal stress was applied on that portion of the curved section which was spaced from point E toward point H by an angular distance of about 30° to 40°. It was also found that the smaller the curvature ratio c was, the greater was the maximum principal stress.

The fatigue tests suggest that if a hollow stabilizer is made of a welded pipe having a thickness ratio m and a curvature ratio c both relatively small, the seam of the pipe should better be positioned at or near point G. That is, the seam should better extend along a curve having as small a curvature as possible. More specifically, as shown in FIG. 3, it is desired that the seam be positioned at point G or be spaced from point G by an angular distance of $\alpha/2$ or less, where $\alpha$ is about 90°. On the other hand, if a hollow stabilizer is made of a welded pipe having a thickness ratio m and a curvature ratio c both relatively large, it is desired that the seam be positioned at point G or H or be spaced from point G or H by an angular distance of $\beta/2$, where $\beta$ is about 60°.

Therefore, according to this invention, in case the stabilizer 1 has a thickness ratio m and a curvature ratio c both relatively large, the seam is so positioned that it extends along a curve having as small or large a curvature as possible and that an angle of about 30° or less is defined by a line passing the axis X-X and the center O and a line passing the axis X-X and the seam. On the other hand, in case the stabilizer 1 has a ratio m and a ratio c both relatively small, the seam is so positioned that it extends along a curve having as small a curvature as possible and that an angle of about 45° or less is defined by a line passing the axis X-X and the center O and a line passing the axis X-X and the seam. Thus positioned, the seam is not exerted with the greatest principal stress, which is applied instead on the other portions stronger against fatigue. Although it is made of a welded pipe, the hollow stabilizer according to this invention is substantially as strong against fatigue and thus as reliable as a hollow stabilizer made of a seamless pipe and is less expensive than a hollow stabilizer made of a seamless pipe.

What is claimed is:

1. A hollow stabilizer for a vehicle, made of a welded metal pipe having a longitudinal welded seam, comprising:

a torsion section to be coupled to a chassis;

a pair of arm sections to be coupled to a wheel suspension; and a pair of curved sections each connecting the torsion section and the corresponding arm section, the seam of each curved section being so positioned that it extends along the largest curvature portion of all of the curved portions of the curved sections thereof such that the principal stress generated during operation of the stabilizer is small, said position being further determined by the ratio of the wall thickness of the pipe to the outer diameter thereof and by the ratio of the radius of curvature of the curved section to the outer diameter thereof.

2. A hollow stabilizer for a vehicle, made of a welded metal pipe having a longitudinal welded seam, comprising:

a torsion section to be coupled to a chassis;

a pair of arm sections to be coupled to a wheel suspension; and a pair of curved sections each connecting the torsion section and the corresponding arm section, the seam of each curved section being so positioned that it extends along the smallest curvature portion of all of the curved portions of the curved sections thereof such that the principal stress generated during operation of the stabilizer is small, said position being further determined by the ratio of the wall thickness of the pipe to the outer diameter thereof and by the ratio of the radius of curvature of the curved section to the outer diameter thereof.

3. A hollow stabilizer for a vehicle, made of a welded metal pipe having a longitudinal welded beam, comprising:

a torsion section to be coupled to a chassis;
 a pair of arm sections to be coupled to a wheel suspension; and
 a pair of curved sections each connected to the torsion section and a corresponding arm section, the seam of each curved section being so positioned that: it extends along a curve having a curvature smaller than that of the axis of the curved section of the pipe when the ratio of the wall thickness of the pipe to to the outer diameter thereof is at least 0.15 and the ratio of the radius of curvature of the curved section to the outer diameter of the pipe is at least 2.5; and in a plane including the center of curvature of the curved section and extending at right angles to the axis of the curved section an angle of about 30° at most is defined by a line intersecting with the axis of the curved section and passing the center of curvature of the curved section and a line intersecting with the axis of the curved section and the seam.

4. A hollow stabilizer for a vehicle, made of a welded metal pipe having a longitudinal welded beam, comprising:

a torsion section to be coupled to a chassis;
 a pair of arm sections to be coupled to a wheel suspension; and
 a pair of curved sections each connected to the torsion section and a corresponding arm section, the seam of each curved section being so positioned that: it extends along a curve having a curvature larger than that of the axis of the curved section of the pipe when the ratio of the wall thickness of the pipe to the outer diameter thereof is at least 0.15 and the ratio of the radius of curvature of the curved section to the outer diameter of the pipe is at least 2.5; and in a plane including the center of curvature of the curved section and extending at right angles to the axis of the curved section an angle of about 30° at most is defined by a line intersecting with the axis of the curved section and passing the center of curvature of the curved section and a line intersecting with the axis of the curved section and the seam.

5. A hollow stabilizer for a vehicle, made of a welded metal pipe having a longitudinal welded beam, comprising:

a torsion section to be coupled to a chassis;
 a pair of arm sections to be coupled to a wheel suspension; and
 a pair of curved sections each connected to the torsion section and a corresponding arm section, the seam of each curved section being so positioned that: it extends along a curve having a curvature smaller than that of the axis of the curved section of the pipe when the ratio of the wall thickness of the pipe to the outer diameter thereof is at most 0.15 and the ratio of the radius of curvature of the curved section to the outer diameter of the pipe is at most 2.5; and in a plane including the center of curvature of the curved section and extending at right angles to the axis of the curved section at an angle of about 45° at most is defined by a line intersecting with the axis of the curved section and passing the center of curvature of the curved section and a line intersecting with the axis of the curved section and the seam.

* * * * *